US005827173A

United States Patent [19]

Lindsay

[11] Patent Number: 5,827,173

[45] Date of Patent: Oct. 27, 1998

[54] PRENATAL AUDIO COMMUNICATION DEVICE

[76] Inventor: Christine M. Lindsay, 13202 S. 86th E. Ave., Bixby, Okla. 74008

[21] Appl. No.: 699,565

[22] Filed: Aug. 19, 1996

[51] Int. Cl.[6] ..................... G01K 11/00

[52] U.S. Cl. ..................... 600/28; 181/24; 181/22

[58] Field of Search ..................... 600/26–28; 607/55, 607/60; 434/319–321; 181/18–21, 177–197

[56] References Cited

U.S. PATENT DOCUMENTS

| | | | |
|---|---|---|---|
| 434,672 | 8/1890 | Mersick | 181/21 |
| 453,848 | 6/1891 | Peirce | 181/20 |
| 453,919 | 6/1891 | Schluchtner | 181/20 |
| 652,926 | 7/1900 | Salmond | 181/20 |
| 771,642 | 10/1904 | Jardine | 181/20 |
| 1,633,705 | 6/1927 | McKesson | 181/18 |
| 2,071,706 | 2/1937 | Reach . | |
| 2,099,871 | 11/1937 | Stern | 181/18 |
| 3,497,809 | 2/1970 | Greenburg | 181/20 |
| 3,930,561 | 1/1976 | Klayman | 181/192 |
| 4,768,612 | 9/1988 | Hodson | 181/21 |
| 4,798,539 | 1/1989 | Henry et al. | 434/319 |
| 4,830,007 | 5/1989 | Stein | 128/421 |
| 4,898,179 | 2/1990 | Sirota | 128/670 |
| 4,934,998 | 6/1990 | Thomas, Jr. | 600/27 |
| 5,033,968 | 7/1991 | Hecht | 434/262 |

*Primary Examiner*—Jennifer Bahr
*Assistant Examiner*—David M. Ruddy
*Attorney, Agent, or Firm*—Frank J. Catalano; Scott R. Zingerman

[57] ABSTRACT

A prenatal audio communication device has a receiving chamber which accepts sound waves for transmission through a flexible tube to a megaphone secured against the abdomen of a pregnant woman so as to transfer sound waves from an external source with which the chamber is juxtaposed to a position proximate the ears of the baby in the womb. Means is connected to the megaphone for encircling the pregnant woman and securing the megaphone outlet port against her abdomen. Preferably, the inlet port has a perimeter contoured to be snugly juxtaposed about the mouth of a typical adult. A curved lip extends along the inlet port perimeter to form a continuous seal between the chamber and the face of the user, to increase the comfort level of the user when the chamber is pressed against the face and to make a single chamber more universally usable with a variety of sound wave source shapes and sizes. Preferably, the securing means is an at least partially elastically stretchable strap which connects to D-ring type members disposed on opposite sides of the megaphone.

17 Claims, 3 Drawing Sheets

*Fig. 3*
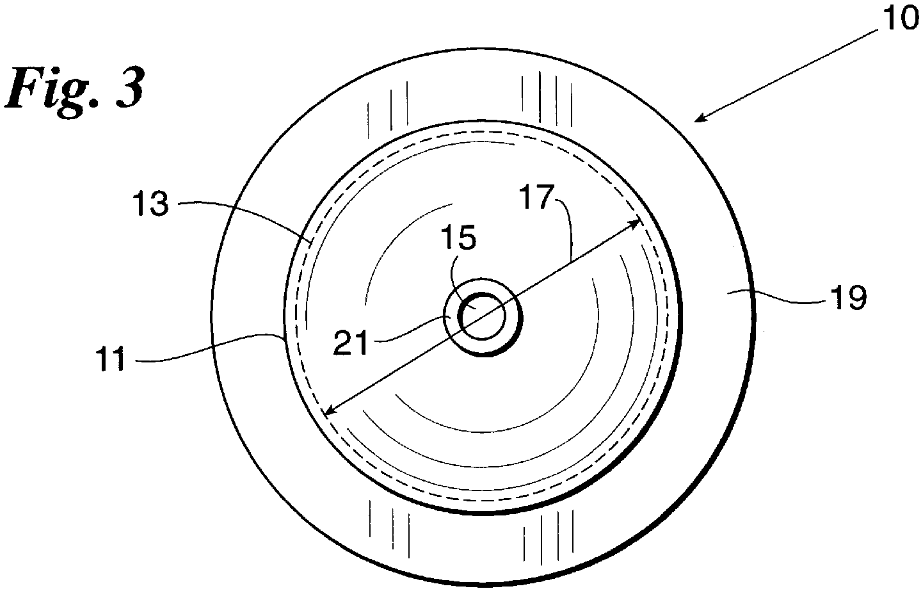
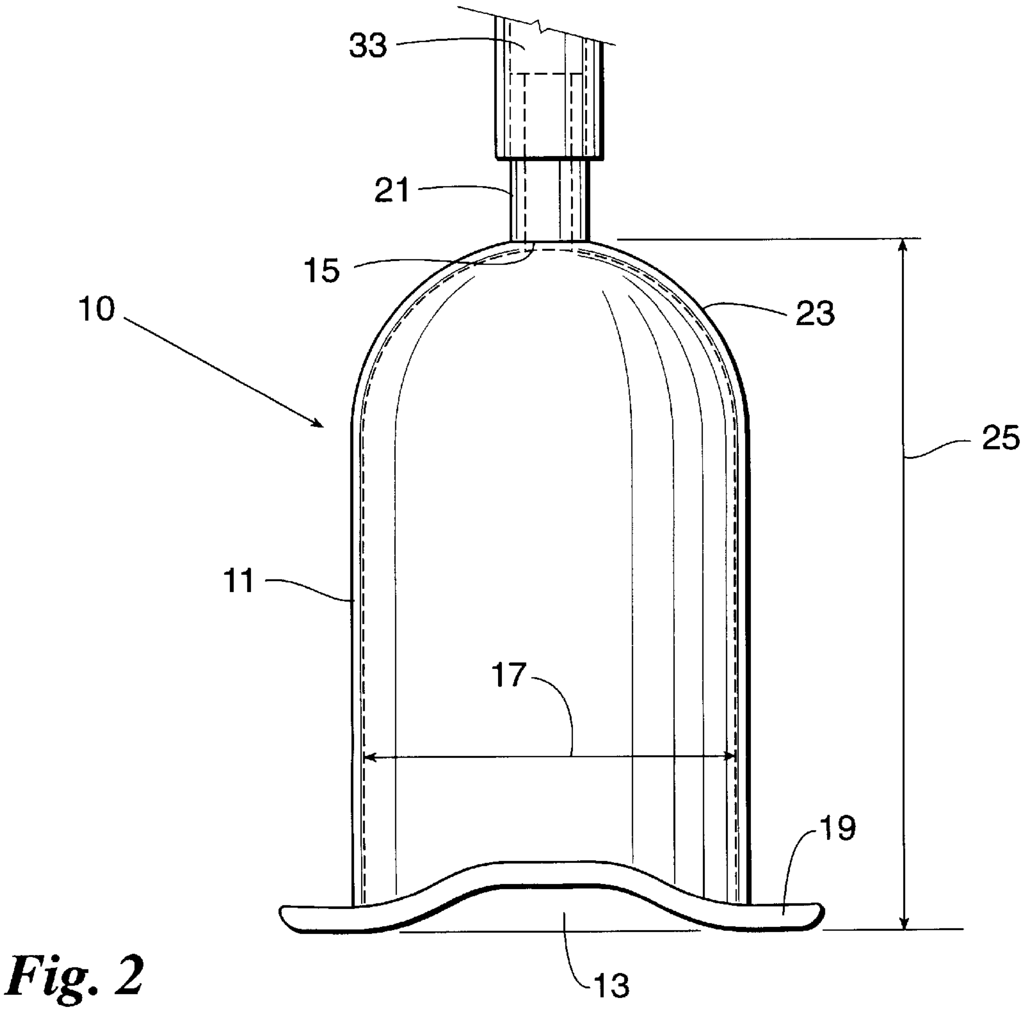
*Fig. 2*

PRENATAL AUDIO COMMUNICATION DEVICE

BACKGROUND OF THE INVENTION

This invention relates generally to prenatal paraphernalia and more particularly concerns a device for use in audio communication to a fetus.

Parental desire to communicate to an unborn child is a very natural instinct. It is generally accepted that the fetus is responsive to external sounds. A mother will often sing to her unborn child, frequently a recommended activity and in many cultures, traditional, or a father will press close against a mother's abdomen to speak to his unborn child. Beyond the intimacy of such communication, it is believed that the unborn child's learning processes begin within the womb, giving prospective parents the opportunity to begin to develop the child's character and talents even before birth. It is known that a fetus reacts to sound as early as the beginning of the second trimester and that, as the term increases, the fetus hears and interprets more and more sound variations.

It is typical in the conduct of such prenatal communication, in an effort to assure transmission of sound to the unborn child, for the parents to physically position themselves in a way to bring the sound source, usually the mouth, as close as possible to the unborn child and to direct the sound toward the unborn child. Thus, the face is generally as close as possible to and turned toward the unborn child. However, this intimate and focused attention is not always convenient or practical. For example, a mother might wish to read to her child or to engage in a totally unrelated activity while communicating to the child which would require her attention and physical actions be directed elsewhere than toward the child. As a result, the quality of the communicated sound may be compromised. Worse yet, the time spent communicating to the unborn child may be significantly limited.

It is, therefore, a primary object of this invention to provide a device which facilitates audio communication to an unborn child. Another object of this invention is to provide a device with which sound waves from an external source can be transmitted to an abdominal area close to the ears of an unborn child. A further object of this invention is to provide a device which directs sound waves from an external source toward the ears of an unborn child. Still another object of this invention is to provide a device which magnifies the sound directed at an unborn child. It is also an object of this invention to provide a device which permits a user to communicate sounds to the abdominal area of a pregnant woman from a distance. Yet another object of this invention is to provide a device which avoids the absorption of and interference with sound waves directed from an external source to an unborn child by objects or conditions between the source and the child. And it is an object of this invention to provide a device which affords a pregnant woman freedom to engage in other activities during communication to her unborn child.

SUMMARY OF THE INVENTION

In accordance with the invention, a prenatal audio communication device is provided in which a receiving chamber accepts sound waves for transmission through a flexible tube to a megaphone secured against the abdomen of a pregnant woman so as to transfer sound waves from an external source with which the chamber is juxtaposed to a position proximate the ears of the baby in the womb.

The receiving chamber has an inlet port for accepting the waves from the external source. The wall of the chamber is substantially rigid and contoured to facilitate the transfer of the sound waves from the inlet port to an outlet port in the chamber. Preferably, the inlet port has a perimeter contoured to be snugly juxtaposed about the mouth of a typical adult. To this end, it is especially preferred that the inlet port perimeter be substantially circular and further be arcuate in relation to its longitudinal axis so that it may surround the lips and come fully into contact with the face of the user. Preferably, a curved rim extends along the inlet port perimeter to help form a continuous seal between the chamber and the face of the user, to increase the comfort level of the user when the chamber is pressed against the face and to make a single chamber more universally usable with a variety of sound wave source shapes and sizes. Preferably, the outlet port of the receiving chamber is circular and the rigid wall is cylindrical with a hemispherical end from which extends the outlet port of the chamber. A chamber having an inlet port inside diameter of approximately 2 to 3 inches and a height of 4 to 8 inches is preferred.

The flexible tube is connected between the outlet port of the receiving chamber and an inlet port in the megaphone and defines a discrete pneumatic sound conducting path between the two. A four to five foot length of half inch plastic tubing has been found to be satisfactory, though different lengths and diameters in a range of ¼ to ¾ inches could be utilized.

The megaphone has a sound wave outlet port, preferably with a substantially circular perimeter of approximately 4 to 8 inches diameter, so as to be snugly juxtaposable against the generally arcuate surface of a pregnant woman's abdomen. Furthermore, the perimeter of the megaphone outlet port is preferably provided with a substantially flat flange thereabout to enhance continuous contact of the outlet port perimeter with her abdomen and to increase her comfort when the megaphone is pressed against her abdomen. The inlet port of the megaphone is preferably circular. Both the megaphone inlet port and the receiving chamber outlet port are sized to accommodate connection to the flexible tubing. The megaphone is typically substantially conical from its inlet port to its outlet port and preferably has a height of approximately 3 to 6 inches.

Means is also connected to the megaphone for encircling the pregnant woman and securing the megaphone outlet port against her abdomen. Preferably, the encircling and securing means will be an at least partially elastically stretchable strap including a means for adjusting the length of the strap. In a particularly preferred embodiment, D-ring type members are disposed on opposite sides of the megaphone, with one end of the strap permanently fixed to one of the D-ring type members and the other end of the strap detachably fastenable to the other of the D-ring type members, perhaps by the use of Velcro. The D-rings can be located at any height on the megaphone but it has been found most desirable that the D-rings extend from the perimeter or flange of the megaphone.

BRIEF DESCRIPTION OF THE DRAWINGS

Other objects and advantages of the invention will become apparent upon reading the following detailed description and upon reference to the drawings in which:

FIG. 2 is a front elevation view of the receiving chamber of the device of FIG. 1;

FIG. 3 is a top plan view of the receiving chamber of FIG. 2;

While invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
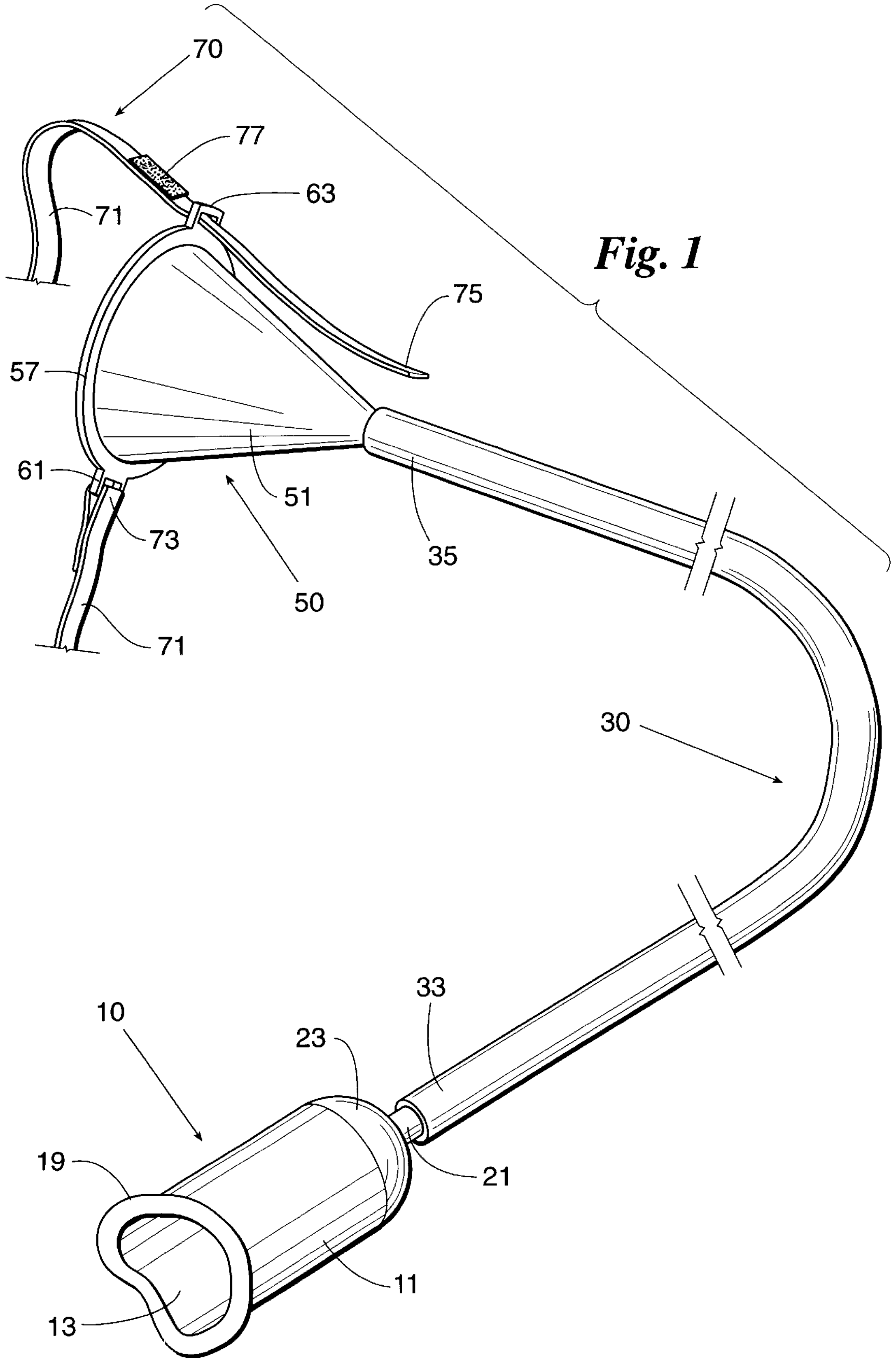
FIG. 1 is a perspective view with parts broken away of a preferred embodiment of the prenatal audio communication device.

Turning first to FIG. 1, a prenatal audio communication device is illustrated in which a receiving chamber 10 accepts sound waves from an external source (not shown) for transmission through a flexible tube 30 to a megaphone 50 which is secured against the abdomen of a pregnant woman (not shown) proximate the ears of her unborn child by a means 70 encircling her body.

The receiving chamber 10 is shown in greater detail in FIGS. 2 and 3. It consists of a substantially rigid continuous wall 11, preferably cylindrical and having a large substantially circular inlet port 13 at one end and a small substantially circular outlet port 15 at the other end. The inlet port 13 will often, though not always, be used to accept sound waves from the mouth of an adult and is, therefor, preferably also arcuate rather than planar so as to be snugly juxtaposable against the face of the user. Furthermore, the dimensions of the inlet port 13 are such as to surround the lips of the user by a sufficient margin as to permit a full range of enunciation by the user. Preferably, the inlet port 13 has an inner diameter 17 in a range of approximately 2 to 3 inches with a ¼ inch arc from a planar reference. It is also preferred that the perimeter of the inlet port 13 has a curved outer lip 19 to help form a continuous seal against the face of the user, to increase the comfort level of the user and to make the inlet port 13 of a given chamber adaptable to a variety of sound wave source shapes and sizes, including children, adults and non-human sources. The outlet port 15 has a substantially cylindrical extension 21 sized to be snugly inserted into one end of the tube 30. The wall 11 is tapered at the outlet end, preferably in a contour which facilitates the transfer of sound waves from the inlet port 13 to the outlet port 15, as shown as a hemisphere 23. Preferably, the receiving chamber 10 has a height 25 of approximately 4 to 8 inches and is made of plastic. A chamber seven inches high and two inches in inner diameter has been found quite suitable.

Returning to FIG. 1, the flexible tube 30 is preferably of plastic with an outer diameter 21 in a range of approximately ¼ to ¾ inches. Half inch tubing with a 1/16 inch wall thickness has been found to work satisfactorily. A four to five foot length is generally sufficient, though any length of tubing could be used. As can best be seen in FIG. 1, one end 33 of the tubing 30 snugly slides over the extension 21 of the receiving chamber outlet port 15 to provide a pneumatically discrete sound conducting path from the receiving chamber 10 to the megaphone 50 which is connected to the other end 35 of the tubing 30.

Figure 5:
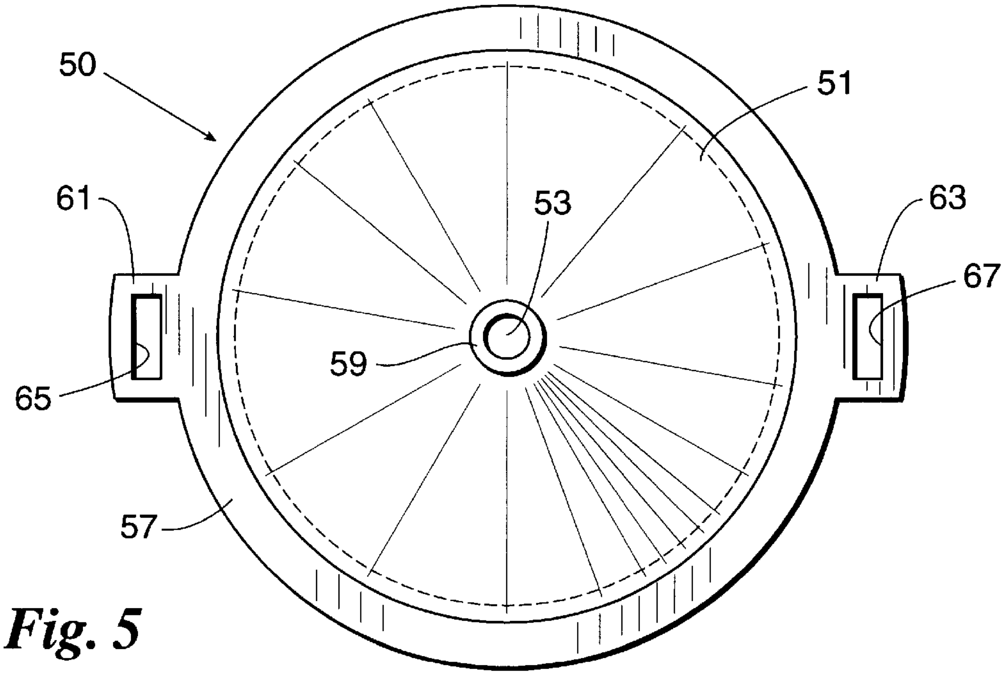
FIG. 5 is a top plan view of the megaphone of FIG. 4.
Figure 4:
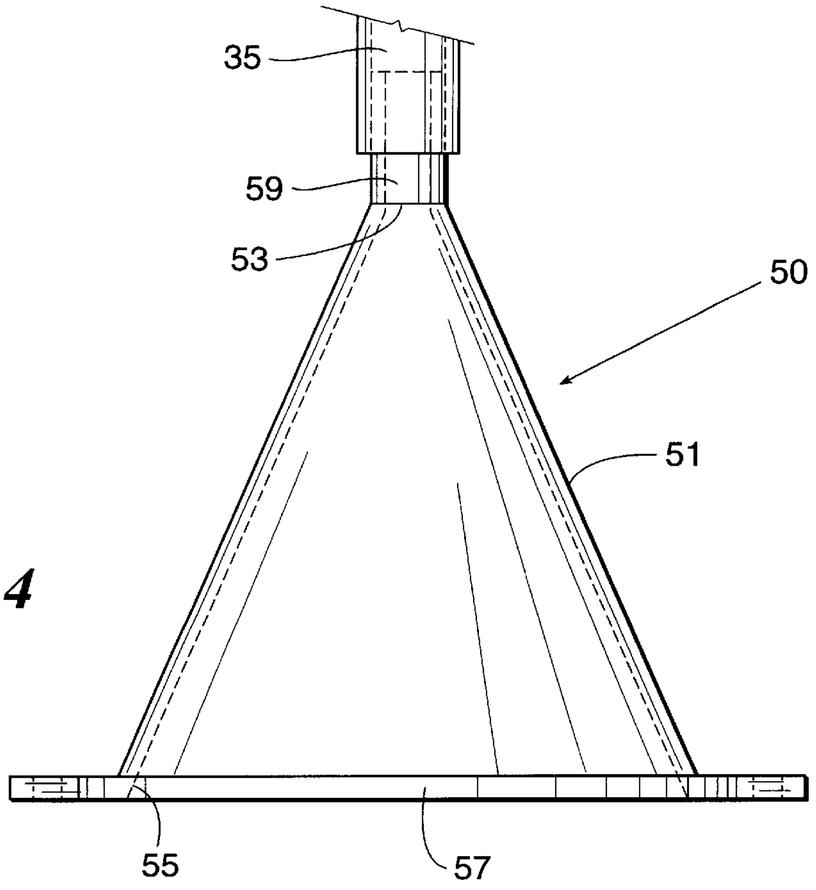
FIG. 4 is front elevation view of the megaphone of the device of FIG. 1.

The megaphone 50 is shown in greater detail in FIGS. 4 and 5. It preferably consists of a substantially rigid continuous wall 51 having a substantially circular inlet port 53 at one end and a substantially circular outlet port 55 at the other end. As shown, the wall 51 preferably tapers conically from the inlet port 53 to the outlet port 55 and has a substantially flat flange 57 about the perimeter of the outlet port 55. The diameters of the outlet port 55 and flange 57 are such as to permit the snug juxtaposition of the perimeter of the outlet port 55 and the flange 57 against the generally arcuate surface of the pregnant woman's abdomen with as enhanced continuous contact and comfort as possible. Outlet port diameters in a range of approximately 4 to 8 inches with a flange diameter in a range of approximately 3/16 to ¾ inches have been found most suitable. The height of the megaphone 50 is typically in a range of approximately 3 to 6 inches. A megaphone 3¾ inches high and 4½ inches in inner diameter has been found to be quite suitable. The inlet port 53 of the megaphone 50 has a substantially cylindrical extension 59 sized to be snugly inserted into the end 35 of the tubing 30, as is best seen in FIG. 4. The megaphone 50 is also preferably provided with a pair of diametrically opposed D-ring type members 61 and 63, as shown integrally extending outwardly from the flange 57, though they could extend from any portion of the megaphone wall 51 or even the lower part of the extension 59 below the tubing 30. The D-rings 61 and 63 define elongated slots 65 and 67.

Returning to FIG. 1, the means 70 for encircling the body of the pregnant woman and for securing the outlet port 55 and flange 57 of the megaphone 50 against her abdomen preferably includes a strap 71 having one end 73 permanently fixed to one of the D-ring type members 61, as shown by looping the strap 71 through the slot 65 in the member 61 and stitching the strap 71 to itself, and another end 75 removably attachable to the other D-ring type member 63, as shown by looping the strap 71 through the slot 67 in the member 63 and adhering the strap 71 to itself by use of a section 77 of Velcro. Preferably the strap 71 is at least partially elastically stretchable and the self adhering section 73 is long enough to permit variation of the length of the strap 71.

In using the prenatal audio communication device, the pregnant woman places the outlet port 55 and flange 57 of the megaphone 50 firmly but comfortably against her abdomen with the center of the outlet port 55 positioned as close to the unborn child's as possible. The strap 71 is then snugly but comfortably extended from the first D-ring type member 61 around her body and through the second D-ring type member 63 and fastened so as to secure the megaphone 50 in place against her abdomen. The receiving chamber 10 is then placed in juxtaposition with the source of sound to be communicated to the unborn child. If the source is a human voice, the curved lip 19 on the inlet port 13 is pressed against the face of the speaker surrounding the lips. The receiving chamber 10 may be held in position by hand or any suitable means, such as a strap arrangement similar to that described with respect to the megaphone 50. Thus, if a woman chooses, for example, to read to her child, at least one hand is free to hold and manipulate the book. In any activity, she is free to assume any comfortable physical position without having to bend toward or direct her voice toward the child and without any concern that a book or other object will physically interfere with or absorb the sound from her lips. Thus, she is free to perform any of a variety of physical activities while focusing her attention on the child.

Thus, it is apparent that there has been provided, in accordance with the invention, a prenatal audio communication device that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A device for transferring sound waves from an external source to the abdomen of a pregnant woman comprising:

a receiving chamber having an inlet port for accepting the sound waves to be transmitted, an outlet port and a substantially rigid wall contoured to facilitate transfer of the sound waves from said inlet port to said outlet port;

a megaphone having a sound wave inlet port and a planar sound wave outlet port, said planar outlet port having a substantially flat flange thereabout flush with said planar outlet port;

a flexible tube defining a discrete pneumatic sound conducting path connecting said receiver outlet port and said megaphone inlet port; and means connected to said megaphone for securing said flange against the abdomen of the pregnant woman.

2. A device for transferring sound waves from an external source to the abdomen of a pregnant woman comprising:

a receiving chamber having an inlet port for accepting the sound waves to be transmitted, an outlet port and a substantially rigid wall contoured to facilitate transfer of the sound waves from said inlet port to said outlet port;

a conical megaphone having a sound wave inlet port and a planar sound wave outlet port, said planar outlet port having a substantially flat flange thereabout flush with said planar outlet port;

a flexible tube defining a discrete pneumatic sound conducting path connecting said receiver outlet port and said megaphone inlet port; and means connected to said megaphone for securing said flange against the abdomen of the pregnant woman.

3. A device for transferring sound waves from an external source to the abdomen of a pregnant woman comprising:

a receiving chamber having an inlet port for accepting the sound waves to be transmitted, an outlet port and a substantially rigid wall contoured to facilitate transfer of the sound waves from said inlet port to said outlet port;

a megaphone having a sound wave inlet port and a planar sound wave outlet port, said planar outlet port having a substantially flat flange thereabout flush with said planar outlet port, said flange having D-ring type portions on opposite sides thereof;

a flexible tube defining a discrete pneumatic sound conducting path connecting said receiver outlet port and said megaphone inlet port; and a girth means connected to said D-ring type portions for encircling the pregnant woman and securing said flange against her abdomen.

4. A device according to claim 1, said receiving chamber inlet port having a perimeter contoured to be snugly juxtaposed against a portion of an adult face surrounding the lips.

5. A device according to claim 4, said receiving chamber inlet port perimeter being substantially circular.

6. A device according to claim 5, said circular inlet port further being substantially arcuate.

7. A device according to claim 5, said receiving chamber outlet port being substantially circular.

8. A device according to claim 7, said receiving chamber wall being cylindrical from said receiving chamber inlet port to a hemispherical end thereof containing said receiving chamber outlet port.

9. A device according to claim 1 further comprising a curved lip along said inlet port perimeter.

10. A device according to claim 1, said flexible tube having an inside diameter of approximately ¼ to ¾ inches.

11. A device according to claim 1, said megaphone outlet port perimeter being substantially circular.

12. A device according to claim 11, said perimeter having a diameter of approximately 4 to 8 inches.

13. A device according to claim 1, said megaphone being substantially right conical.

14. A device according to claim 13, said substantially right conical megaphone having a height of approximately three to six inches.

15. A device according to claim 3, said girth means having one end thereof permanently fixed to one of said D-ring type portions and another end detachably fastenable to another of said D-ring type portions.

16. A device according to claim 3, said girth means having means therein for adjusting a length thereof.

17. A device according to claim 3, at least a part of said girth means being elastically stretchable.

* * * * *